(12) United States Patent
Knoop

(10) Patent No.: US 11,085,200 B2
(45) Date of Patent: Aug. 10, 2021

(54) CLIMBING DEVICE FOR CARRYING OUT A MOVEMENT RELATIVE TO A TOWER AND METHOD FOR PRODUCING A TOWER

(71) Applicant: Wobben Properties GmbH, Aurich (DE)

(72) Inventor: Frank Knoop, Aurich (DE)

(73) Assignee: Wobben Properties GmbH, Aurich (DE)

( * ) Notice: Subject to any disclaimer, the term of this patent is extended or adjusted under 35 U.S.C. 154(b) by 137 days.

(21) Appl. No.: 16/303,532

(22) PCT Filed: May 23, 2017

(86) PCT No.: PCT/EP2017/062408
§ 371 (c)(1),
(2) Date: Nov. 20, 2018

(87) PCT Pub. No.: WO2017/202841
PCT Pub. Date: Nov. 30, 2017

(65) Prior Publication Data
US 2020/0308864 A1    Oct. 1, 2020

(30) Foreign Application Priority Data
May 27, 2016   (DE) .................... 10 2016 109 818.3

(51) Int. Cl.
*E04H 12/34* (2006.01)
*F03D 13/10* (2016.01)
(Continued)

(52) U.S. Cl.
CPC ......... *E04H 12/342* (2013.01); *B66C 23/185* (2013.01); *B66C 23/207* (2013.01);
(Continued)

(58) Field of Classification Search
CPC ..... E04H 12/342; E04H 12/12; B66C 23/207; B66C 23/185
See application file for complete search history.

(56) References Cited

U.S. PATENT DOCUMENTS 4,028,792 A * 6/1977 Tax ...................... B66C 23/283
                                                29/431
7,160,085 B2   1/2007 de Roest
(Continued)

FOREIGN PATENT DOCUMENTS

DE     2617770 A1 * 11/1977 ............... E04G 1/38
EA         020977 B1    3/2015
(Continued)

*Primary Examiner* — Adriana Figueroa
(74) *Attorney, Agent, or Firm* — Seed Intellectual Property Law Group LLP

(57) ABSTRACT

A climbing device for carrying out a movement relative to a tower, to a part-ring segment for a tower, to a tower, to a wind power installation, and to a method for producing a tower. A climbing device for carrying out a movement relative to a tower, comprising a main body having a longitudinal extent from a first end to a second end, wherein the second end in an operating state faces a foundation of a tower; at least one first climbing element having an extent between a first inner end and a first holding end; at least one second climbing element having an extent between a second inner end and a second holding end; wherein the first climbing element is disposed and configured for carrying out a first holding movement of the first holding end relative to the main body, by way of a first holding movement direction that is orthogonal to the longitudinal extent, and/or for carrying out a first climbing movement of the first holding end relative to the main body.

19 Claims, 5 Drawing Sheets

(51) Int. Cl.
    *F03D 13/20*     (2016.01)
    *B66C 23/18*     (2006.01)
    *B66C 23/20*     (2006.01)
    *E04H 12/12*     (2006.01)

(52) U.S. Cl.
    CPC ............ *E04H 12/12* (2013.01); *F03D 13/10* (2016.05); *F03D 13/20* (2016.05)

(56) References Cited

U.S. PATENT DOCUMENTS

| | | | |
|---|---|---|---|
| 8,117,799 B2 * | 2/2012 | Kristensen | E04H 12/344 |
| | | | 52/745.17 |
| 8,807,611 B2 | 8/2014 | Lülker | |
| 9,175,670 B2 * | 11/2015 | Lockwood | E04H 12/12 |
| 9,238,923 B2 * | 1/2016 | Arlaban Gabeiras | |
| | | | B66C 23/207 |
| 2009/0173577 A1 | 7/2009 | Wobben | |
| 2011/0203219 A1 | 8/2011 | Kristensen | |
| 2017/0218652 A1 * | 8/2017 | Neighbours | E04H 12/12 |

FOREIGN PATENT DOCUMENTS

| | | | |
|---|---|---|---|
| EP | 1861564 B1 | 5/2010 | |
| EP | 2746571 A2 | 6/2014 | |
| JP | H11-82285 A | 3/1999 | |
| JP | 2012071915 A | * | 4/2012 |
| RU | 2377438 C2 | 12/2009 | |
| RU | 2574303 C2 | 2/2016 | |
| SU | 217621 A1 | 5/1968 | |
| SU | 1569400 A1 | 6/1990 | |
| WO | 03069099 A1 | 8/2003 | |
| WO | 2010049313 A2 | 5/2010 | |

* cited by examiner

CLIMBING DEVICE FOR CARRYING OUT A MOVEMENT RELATIVE TO A TOWER AND METHOD FOR PRODUCING A TOWER

BACKGROUND

Technical Field

The invention relates to a climbing device for carrying out a movement relative to a tower, to a part-ring segment for a tower, to a tower, in particular for a wind power installation, to a wind power installation, and to a method for producing a tower.

Description of the Related Art

Towers are used in various fields of application and are configured, for example, as television towers, telecommunications towers, chimneys, or towers for wind power installations. Towers of the type mentioned at the outset are typically slender buildings which preferably have a great height and furthermore preferably, in a manner orthogonal to said height, have comparatively minor dimensions. Towers are preferably composed substantially of concrete and/or steel, or comprise said materials. The spectrum of embodiments of towers ranges from lattice constructions and tubular steel towers with or without securing cables to concrete structures which can be configured as solid constructions and/or be assembled from individual segments. Lattice constructions typically provide high and rigid tower constructions, wherein the aesthetic effect of lattice towers of this type is typically considered to be deficient.

Tubular steel towers are often used, wherein tubular steel towers are typically composed of a single component or of a plurality of components or comprise components of this type. Tubular steel towers can be provided as guy-line towers which have additional ropes, cables, or supports which support the tubular steel tower in one or a plurality of directions. There is furthermore the possibility of providing self-supporting tubular steel towers which typically do not have any guy lines.

Beyond the above, concrete construction modes are often provided for towers. Such concrete towers are implemented either as slack towers, that is to say towers that are provided with a usual steel reinforcement, or else previously stressed prestressed concrete towers are used. Said concrete towers, by virtue of the high weight thereof, are either cast at an installation site, or the tower is assembled from individual segments, wherein the individual segments can be prefabricated.

Towers can have cylindrical and/or conical portions, in particular along the longitudinal extent of said towers, wherein towers in many instances comprise cylindrical and conical proportions. Cross sections having a plurality or a multiplicity of corners, such as polygonal cross sections, for example, can also be used for towers. It is a challenge to transport the in some instances heavy segment components from a production site to an installation site of the tower. Individual, for example annular or part-annular, segment components of a tower can have individual part weights of approx. 30 tons to 50 tons, for example. Heavy load transportation is typically required for transporting segment components of this type, said heavy load transportation often being associated with high costs. Furthermore, heavy load transportation is typically inflexible in temporal terms, since certain curfews that are mostly time-related exist in many regions/countries.

Moreover, the on-site handling of segment components of such weight when constructing a tower can be disadvantageous. The construction of a tower is often stopped in particular in the case of inclement weather conditions when segment components of such weight are installed, since said heavy segment components often have a large wind-exposed area and the wind can thus impinge a segment component with a force that is difficult to judge. Moreover, the required precise placing of the segment components on one another is often associated with difficulties. In particular the disposal of heavy segment components at a height of more than 50 m, in particular of more than 75 m, and in particular also of more than 100 m, is a challenge in terms of a required crane, in particular in terms of a secure and/or cost-effective and/or precise placing of the segment components.

Cranes for the assembly of towers preferably have a large reach and moreover are distinguished by a sufficient stability despite the large reach. Cranes of this type are indeed available but are often associated with high costs. The devices and methods that exist for operating such devices offer various advantages but further improvements are desirable.

The German Patent and Trademark Office in the priority application to the present application has searched the following prior art: EP 1 861 564 B 1.

BRIEF SUMMARY

Provided is a method and climbing device which provides a rapid and/or safe and/or precise and/or cost-effective assembly of a tower and which reduces the complexity of a tower construction.

Provided is a climbing device for carrying out a movement relative to a tower, in particular a wind power installation tower, comprising a main body having a longitudinal extent from a first end to a second end, wherein the second end in an operating state faces a foundation of a tower; at least one first climbing element having an extent between a first inner end and a first holding end; at least one second climbing element having an extent between a second inner end and a second holding end; wherein the first climbing element is disposed and configured for carrying out a first holding movement of the first holding end relative to the main body, by way of a first holding movement direction that is orthogonal to the longitudinal extent; and/or carrying out a first climbing movement, in particular for moving the climbing device relative to a tower, of the first holding end relative to the main body, by way of a climbing movement direction that is parallel with the longitudinal extent; and/or the second climbing element is disposed and configured for carrying out a second holding movement of the second holding end relative to the main body, by way of a second holding movement direction that is orthogonal to the longitudinal extent; and/or carrying out a second climbing movement, in particular for moving the climbing device relative to a tower, of the second holding end relative to the main body, by way of a climbing movement direction that is parallel with the longitudinal extent.

The invention is based inter alia on the concept that towers, in particular of wind power installations, reach ever greater tower heights. The reason therefore is in particular the steadily increasing hub height and/or the steadily increasing rotor diameter. On account of these ever increasing tower heights, a solution which in the long term guarantees a rapid and/or safe and/or precise and/or cost-effective assembly of towers is desirable. It is foreseeable and, to some extent already the case nowadays, that the construction of towers, in particular of towers for wind power installations using conventional crane devices, if at all is possible only with greatly increased difficulties. The invention is furthermore based on the concept that a climbing device which enables an in particular economically advantageous construction of a tower even in the case of very high tower heights can be provided in, or on, or on top of, a tower, respectively.

The climbing device is preferably configured for being disposed in the interior of a tower and for carrying out a movement relative to a tower in the interior of said tower. The climbing device can thus preferably climb continuously or successively in the interior of a tower. The climbing device comprises the main body having the longitudinal extent, wherein the longitudinal extent in the operating state, that is to say the climbing device is disposed on, or in, or on top of, a tower, respectively, is aligned so as to be substantially parallel with a longitudinal extent of the tower. The longitudinal extent and/or the tower height of a tower extends in particular from a foundation which is disposed close to the ground to a tower tip. The longitudinal extent of the main body furthermore extends between the first end and the second end, wherein the climbing device in the operating state is disposed on the tower in such a manner that the second end faces the foundation. The first end faces away from the foundation and in particular points in a direction that faces away from the surface of the earth.

The climbing device furthermore comprises at least one first climbing element having the extent between the first inner end and the first holding end. The at least one first climbing element is preferably disposed so as to be movable on the main body. The inner end of the first climbing element is furthermore preferably disposed within the main body. The at least one second climbing element extends from a second inner end to a second holding end, wherein the second inner end is preferably disposed within the main body of the climbing device.

The first climbing element is disposed and configured for carrying out a first holding movement of the first holding end relative to the main body. The first holding end preferably moves between a standby position and a holding position. The standby position of the first holding element is preferably within the main body, in a wall of the main body, and/or in a region adjacent to the main body. The holding position of the first holding end is at all times preferably farther apart from the main body than one of the aforementioned standby positions. The holding movement of the first holding end comprises a first holding movement direction which is aligned so as to be orthogonal to the longitudinal extent. This means that the holding movement has a movement proportion which is aligned in the direction orthogonal in relation to the longitudinal extent of the climbing device. The holding movement can furthermore comprise a further movement proportion which is aligned in the longitudinal direction.

The holding position of the first holding end is preferably configured in such a manner that the first holding end and/or the first climbing element in this position within or outside a tower can establish a connection to the tower. It is particularly preferable for this connection to be performed by a form-fit, wherein the latter is guaranteed, for example, by way of a step of the tower having a horizontal area proportion on which the first climbing element can be supported. It is furthermore preferable for the connection to be guaranteed by a force-fit, for example by way of a friction force and/or an adhesive force and/or a suction force. The connection between the climbing element and the tower is preferably designed so as to be releasable. The connection implements in particular forces that act vertically, in particular in the direction of the tower tip, such that the weight forces and optionally further forces of the climbing device, for example on account of the ascent of the latter, can be absorbed.

The first climbing element is furthermore disposed and configured for carrying out the first climbing movement. As soon as a connection between the first climbing element and a tower has been configured on account of the holding movement of the first holding end of the first climbing element, and a support of the climbing element on the tower is guaranteed, the first climbing movement can start. The climbing movement is performed in particular for moving the climbing device and/or the main body relative to the tower. This movement is performed in that the first holding end is moved relative to the main body by way of the movement direction proportion which is aligned so as to be parallel with the longitudinal extent of the main body and/or of the tower. In order to ascend in the direction of the tower tip, the first holding end moves in the direction of the second end of the main body. In order to descend in the direction of the tower foundation, the first holding end moves in the direction of the first end of the main body.

The second climbing element is likewise disposed and configured for carrying out a second holding movement and a second climbing movement. The movement paths and/or movement speeds and/or movement accelerations are preferably configured in a manner analogous to those of the first climbing element. Once the first climbing element has carried out a holding movement and the climbing device is thus supported on a tower and has subsequently moved relative to a tower on account of the first climbing movement, the second climbing element can likewise carry out a second holding movement of the second holding end and be likewise supported on a preferably further portion of the tower and thus establish a connection to the tower. Thereupon the second climbing element preferably carries out a second climbing movement, in particular for moving the climbing device and/or the main body relative to a tower, of the second holding end relative to the main body such that the climbing device and/or the main body are/is moved in a direction. Said direction which is implemented by the second climbing movement is preferably the same direction as the direction which is implemented by the first climbing movement. There is thus the possibility for the climbing device to ascend within a tower.

The first climbing element preferably carries out a holding movement in the direction of the standby position as soon as the second climbing element is connected to the tower, thus is in the holding position, and/or the second climbing movement is being carried out. Furthermore preferably, the second climbing element from the holding position carries out a second holding movement in the direction of the standby position, while the first climbing element carries out a first climbing movement. By retracting the currently non-supporting climbing element from a holding position to a standby position it is typically guaranteed that the currently non-supporting climbing element does not block the movement procedure. Furthermore, the climbing element that is currently not actively used for the climbing movement and/or for the holding procedure is thus returned to an initial position and, directly after the completion of the climbing movement of the other climbing element, can again carry out the holding movement and/or the climbing movement.

The climbing movements are preferably carried out from an upper reversal point to a lower reversal point. The upper reversal point preferably faces the first end of the main body, and the lower reversal point preferably faces the second end of the main body. At the beginning of the climbing movement, the climbing element and/or the holding end thereof is preferably disposed at the upper reversal point or in a region adjacent to the upper reversal point, and during the climbing movement carries out a movement from the upper reversal point or a region adjacent to the latter to the lower reversal point or to a region adjacent to the latter. As soon as a climbing element and/or the holding end thereof does not carry out any supporting function for the climbing device, and the climbing element and/or the holding end thereof is disposed in a standby position or is currently being displaced thereto, the climbing element and/or the holding end thereof is preferably displaced from the lower reversal point or a region adjacent to the latter back to the upper reversal point or a region adjacent to the latter so as to be again prepared for a climbing movement. On account of the movement of the climbing element and/or the holding end thereof from the upper reversal point to the lower reversal point, the main body carries out a movement relative to the tower, said movement being aligned substantially in the direction of the longitudinal extent of the main body and/or of the tower. On account of the climbing movement of the first climbing element and of a subsequent climbing movement of the second climbing element, the climbing device carries out a movement relative to the tower.

By way of a climbing device of this type there is the possibility for the climbing device to ascend within a tower or else outside a tower, and/or also to descend again and to thus carry out a movement relative to the tower. The climbing device in the holding position is held in a defined position by way of the first or of the second climbing element. On account of the climbing movement of the first or of the second climbing element and/or of the first or of the second holding end from an upper reversal point to a lower reversal point, the main body of the climbing device moves in a preferably vertical direction in the direction of a tower tip and/or in the direction that faces away from the foundation of the tower. On account of the subsequent movement of the respective currently non-supporting climbing element to a holding position and of a renewed ascent by way of a climbing movement of said climbing element and/or of the holding end thereof, there is the possibility for the climbing device to ascend in a tower.

Not only the climbing device per se but further elements required in particular for the erection and/or assembly of the wind power installation, in particular of a tower of a wind power installation, such as, for example, components, work implements, or else people can be conjointly conveyed by means of this climbing device. The climbing device can in particular be used for conveying and/or positioning tower segments, in particular in order for the tower to be successively constructed at the upper end. The climbing device can furthermore preferably be used for conjointly conveying, for example, tension members and/or tension cords upward in the tower, in particular to the tower tip. The climbing device can furthermore be used for conveying people and/or loads, in particular in the construction state of the tower, in particular to the height of the climbing device. For example, climbing aids, construction members, load conveying baskets and/or passenger conveying baskets or similar transportation aids can thus climb conjointly with the climbing device upward in the tower, and/or be fastened on the climbing device so as to be movable, wherein this movement can preferably also be driven, in particular movable in the vertical direction.

The lower reversal point of the at least one first climbing element is preferably spaced apart from an upper reversal point of the at least one second climbing element. It is particularly preferable for the spacing of the lower reversal point of the at least one first climbing element to have a smaller spacing from the first end of the main body than the upper reversal point of the at least one second climbing element. The upper reversal point of the at least one first climbing element is furthermore preferably disposed in a region adjacent to the first end, and the lower reversal point of the at least one first climbing element is disposed in a region adjacent to the second end. The upper reversal point of the at least one second climbing element is preferably disposed in a region adjacent to the first end, and the lower reversal point of the at least one second climbing element is disposed in a region adjacent to the second end. Furthermore preferably, the lower reversal point of the at least one first climbing element has a larger spacing from the first end than the upper reversal point of the at least one second climbing element.

In one preferred variant of embodiment of the climbing device it is provided that the climbing device comprises two or a plurality of first climbing elements, and/or comprises two or a plurality of second climbing elements. The stability of the climbing device during the supporting and/or climbing procedure can be improved on account of the disposal of two or a plurality of climbing elements. It is particularly preferable for the climbing device to comprise three or a plurality of first and/or second climbing elements, since a particular stability of the climbing device can be guaranteed beyond a number of three climbing elements. In this instance there is in particular the possibility for the climbing elements by way of the holding ends thereof to form in each case a force-fitting connection to a, for example, vertical tower wall in that the directions of force of said climbing elements for said force-fitting connection are aligned so as to be completely or partially counter to one another. This enables the climbing device to ascend in particular in towers that are configured in an almost arbitrary manner.

According to one further particularly preferred variant of embodiment of the climbing device it is provided that the at least one first climbing element has a first drive region adjacent to the first inner end, wherein the first inner end is preferably disposed in an interior of the main body, and/or the at least one second climbing element has a second drive region adjacent to the second inner end, wherein the second inner end is preferably disposed in the interior of the main body. The drive regions of the at least one first climbing element and/or of the at least one second climbing element are preferably disposed and configured such that said drive regions can be coupled to a drive. In particular, at least one of the drive regions has a coupling element which is configured, for example, as a groove and/or an opening and/or a denticulation and/or a roller and/or a face.

According to one further particularly preferred variant of embodiment of the climbing device it is provided that the climbing device has at least one drive, preferably a hydraulic drive and/or an electric drive, which is disposed and configured for moving the at least one first climbing element, preferably at the first drive region, and/or the at least one second climbing element, preferably at the second drive region, in the holding movement direction and/or the climbing movement direction.

The drive preferably moves all climbing elements of the climbing device in the holding movement direction and the climbing movement direction. Preferably only a single drive, for example an electric motor, is provided in this variant of embodiment. In one further variant of embodiment the climbing device comprises two, three, or a plurality of drives which can move the climbing elements in the holding movement direction and/or the climbing movement direction. It is particularly preferable for the first climbing elements to have a first drive, wherein the first drive moves the climbing elements in the holding movement direction and/or the climbing movement direction, and for the second climbing elements to have a second drive which moves the second climbing elements in the holding movement direction and/or the climbing movement direction. Furthermore preferably, each of the climbing elements comprises a single drive which moves the respective climbing element in the holding movement direction and/or the climbing movement direction. Moreover, each climbing element can preferably have one single drive each for the climbing movement direction and the holding movement direction.

According to one further preferred variant of embodiment of the climbing device it is provided that a region adjacent to the holding end of the at least one first climbing element and/or of the at least one second climbing element is disposed and configured for forming a force-fitting and/or form-fitting connection to a preferably inner wall of a tower. For example, the climbing elements can have a substantially horizontal alignment, having a planar extent of which the orthogonal of the plane is directed in the direction of the longitudinal extent of the main body and furthermore in the direction of the foundation of the tower. The at least one first climbing element and/or the at least one second climbing element, for example by way of a step which preferably likewise has a horizontal face and/or a horizontal directional component, can establish a form-fitting connection to said horizontal face.

The climbing elements furthermore preferably have in each case a vertical face on the holding end, wherein said vertical face preferably comprises an elastic material by way of which the climbing element can be supported on an at least partially vertical wall of the tower. By supporting two or three climbing elements which are preferably disposed so as to be uniformly distributed about the main body, normal forces between the vertical face of the climbing element and the wall of a tower can be configured such that a sufficient holding force in the vertical direction is provided for the climbing device on account of the friction force on the vertical faces of the climbing device and of the wall of a tower.

In one further preferred variant of embodiment of the climbing device it is provided that the at least one first climbing element and/or the at least one second climbing element on the holding end have/has a U-shaped profile. In one further variant of embodiment of the climbing device it is provided that the at least one first climbing element and/or the at least one second climbing element comprise/comprises at least one damping element.

In one further particularly preferred variant of embodiment of the climbing device it is provided that the two or plurality of first climbing elements in the circumferential direction have in each case the same spacing from a neighboring first climbing element, and/or the two or plurality of second climbing elements in the circumferential direction have in each case the same spacing from a neighboring second climbing element. The first climbing elements in this variant of embodiment are uniformly distributed along the circumference. The second climbing elements in this variant of embodiment are uniformly distributed along the circumference. In the case of a rotationally symmetrical main body, two climbing elements are mutually spaced apart by 180°, for example. In this variant of embodiment, three climbing elements are mutually spaced apart by 120°, and four climbing elements are mutually spaced apart by 90°.

In one further variant of embodiment of the climbing device it is provided that the at least one first climbing element and the at least one second climbing element at all times have a spacing in the direction of the longitudinal extent. It is in particular provided in this variant of embodiment that the lower reversal point of the first climbing element has a smaller spacing from the first end and the upper reversal point of the second climbing element. In one further variant of embodiment of the climbing device it is provided that the holding movement direction is aligned in a direction that is radial to the longitudinal extent.

In one further particularly preferred variant of embodiment of the climbing device it is provided that the at least one first climbing element is configured for simultaneously carrying out the first climbing movement and the first holding movement, and/or that the at least one second climbing element is configured for simultaneously carrying out the second climbing movement and the second holding movement. This simultaneous execution of the holding movement and of the climbing movement is preferably carried out by the climbing elements exclusively when said climbing elements are only used in a passive manner. Passive means in particular that said climbing elements are currently not responsible for the climbing movement of the climbing device and/or for holding the climbing device. This simultaneous execution of a climbing movement and of a holding movement by the first and/or the second climbing element is thus provided in particular for returning the climbing elements back to an initial position. The climbing element from the initial position can then again carry out the holding movement and/or the climbing movement in order for the main body to be moved relative to a tower.

According to one further preferred variant of embodiment of the climbing device it is provided that the climbing device, in particular the drive, is configured for carrying out in each case in a mutually independent manner the first climbing movement and/or the second climbing movement and/or the first holding movement and/or the second holding movement of the at least one first climbing element, or of the at least one second climbing element, or of the ends thereof, respectively. The independent execution of the individual movements of the at least one first climbing element and/or of the at least one second climbing element and/or of the ends thereof results inter alia in that the position of the climbing device can be aligned individually by the climbing elements. Uneven spots within a tower and/or on the support points for the climbing device on a tower can thus be equalized in particular when a control device is provided. Furthermore preferably, a limited number of the first climbing elements present and/or a limited number of the second climbing elements present can thus be used for a climbing movement. This can be advantageous, for example, when there is currently no holding position for individual climbing elements on a tower.

According to one further particularly preferred variant of embodiment the climbing device comprises a safety mechanism, wherein a holding movement of the first climbing element is possible only when a region adjacent to the holding end of the second climbing element is connected to a preferably inner wall of a tower, and/or a holding movement of the second climbing element is possible only when a region adjacent to the holding end of the first climbing element is connected to a preferably inner wall of a tower. It is thus preferably ensured that the first climbing elements are not located in a standby position simultaneously with the second climbing elements, and/or move toward a standby position and no climbing element is thus any longer located in a holding position. In the case of the climbing elements being in each case in a standby position and/or moving toward a standby position, the climbing device is no longer supported within the tower or outside the tower and, on account of gravity, carries out a typically uncontrolled movement in the direction of the tower foundation.

According to one further preferred variant of embodiment the climbing device comprises a control device which is disposed and configured for controlling in an open loop and preferably in a closed loop the movement relative to a tower, in particular a wind power installation tower, in that the first climbing movement and/or the second climbing movement and/or the first holding movement and/or the second holding movement of the at least one first climbing element, or of the at least one second climbing element, are/is preferably determined in relation to the movement path and/or the movement speed and/or the movement accelerations, and furthermore so as to depend on a temporal point. The control device can thus control in an open loop and preferably in a closed loop a preferably precise alignment of the climbing device within a tower and/or outside a tower. Apart from an advantageous ascending movement of the climbing device within and/or outside the tower, further influencing variables can also be considered by the control device. For example, different load conditions at or on the climbing device can be considered by the control device and various equalization movements can thus be controlled by the control device. In one further preferred variant of embodiment of the climbing device the latter comprises a control device which is disposed and configured for controlling in an open loop and/or implementing and preferably controlling in a closed loop the safety mechanism. The climbing device furthermore preferably comprises a control device which comprises the aforementioned variants of embodiment of the control device.

According to one further preferred variant of embodiment of the climbing device it is provided that the climbing device comprises a lifting device, wherein the lifting device is preferably disposed on the first end of the main body. In one further variant of embodiment of the climbing device it is provided that the lifting device is configured as a crane, preferably having a support element that is aligned in the direction of the longitudinal extent, and furthermore preferably having a rotatably disposed jib which is disposed on an end of the support element that faces away from the climbing device. On account of the provision of a crane and/or of a lifting device on the climbing device, the tower can also be successively constructed in that the crane moves individual part-ring segments for the tower to an assembly position prior to said part-ring segments being assembled, and the crane conjointly with the climbing device subsequently ascends on the previously assembled segments and further part-ring segments can in turn be subsequently disposed.

According to one further aspect of the present invention provided is a part-ring segment for a tower, in particular for a tower of a wind power installation, said part-ring segment being configured as an envelope segment, preferably as a concrete member, preferably of steel and/or prestressed concrete, and having a step, preferably having at least one face that in the operating state is substantially horizontal, said step being configured as a force-engagement face for a climbing element of a climbing device according to at least one of the variants of embodiment mentioned above. The part-ring segment is preferably configured in such a manner that said part-ring segment can be lifted by a lifting device which is disposed on a climbing device, in particular a climbing device according to at least one of the variants of embodiment described above.

In one preferred variant of embodiment of the part-ring segment it is provided that the dimensions and/or the weight of the part-ring segment enable/enables conventional transportation, for example by way of a truck. The part-ring segment is preferably configured in such a manner that no heavy load transportation is required for the transportation from a production site to an installation site of a tower. Furthermore, the comparatively compact part-ring segments offer an advantageous potential for disassembly, for example after the service life of the tower has expired. The step in the operating state and/or in the assembled state has a step which is configured as a force-engagement face for a climbing element of a climbing device. The force-engagement face can have directional components that are substantially horizontal, substantially vertical, or vertical and horizontal.

The part-ring segment is furthermore preferably configured in such a manner that said part-ring segment can be disposed on a further part-ring segment and preferably be connected thereto. Furthermore preferably, part-ring segments that are disposed next to one another in an expert manner form a tower and/or a portion of the tower. Furthermore preferably, the part-ring segments have grooves and/or steps and/or edges which enable an in particular form-fitting connection of the part-ring segments.

The part-ring segment can preferably have a weight-optimized, in particular weight-reduced, shape. For example, the part-ring segment, in particular on a side that in the installed state faces the interior of the tower, can have a rib structure having one or a plurality of ribs. Such ribs can preferably increase the rigidity of the part-ring segment which simultaneously can enable a lighter construction mode. The one rib or the plurality of ribs can preferably simultaneously serve as a step having a force-engagement face for a climbing element of a climbing device.

Alternatively or additionally to a steel reinforcement, the part-ring segment can have a fiber and/or textile reinforcement, for example comprising glass fibers and/or synthetic material fibers and/or carbon fibers and/or glass-fiber woven fabrics and/or man-made-fiber woven fabrics and/or carbon-fiber woven fabrics and/or a micro-reinforcement. A micro-reinforcement, for example, can have fine short fibers (6 to 24 mm long, and thinner than 50 micron, for example) which are distributed in a homogenous manner. The part-ring segment can be configured so as to be prestressed and/or be prestressed conjointly with further part-ring segments in the installed state.

The part-ring segment can be configured and be suitable for various tower cross sections, for example for a circular or a polygonal cross-section. The part-ring segment per se can also have a shape that is polygonal in the cross-section.

The part-ring segment preferably comprises a groove and/or a tongue, in particular for disposing the part-ring segment on a further part-ring segment. Moreover, the part-ring segment can comprise one, two, or a plurality of, bushes which are disposed and configured for enabling a fastening of the part-ring segment to one, two, or a plurality of, further part-ring segments, in particular by way of a screw connection.

According to one further aspect of the present invention provided is a tower, in particular for a wind power installation, having annular tower portions, comprising a multiplicity of part-ring segments, in particular part-ring segments according to the preceding aspect, which mutually abut on at least one substantially vertical abutment and on at least one substantially horizontal abutment. The preferably annular tower portions can have internal faces and/or circumferential faces having a round and/or oval and/or slot-shaped and/or triangular and/or quadrangular and/or polygonal profile. Moreover, the part-ring segment can be configured so as to be suitable for a lattice tower.

According to one further aspect of the present invention provided is a wind power installation comprising a tower, in particular a tower according to the preceding aspect, having a cross section that is orthogonal to the longitudinal extent of the wind power installation, wherein the cross section is configured so as to be substantially round, in particular circular, and/or angular, in particular triangular and/or polygonal.

According to one further aspect of the present invention provided is a method for producing a tower, comprising the following method steps: disposing a climbing device, preferably having a lifting device, in particular a climbing device according to at least one of the variants of embodiment mentioned above, within a tower or on a tower; and/or supporting the climbing device on a wall, preferably on an inner wall, of the tower, preferably on at least one step of a part-ring segment, the at least one first climbing element being in a holding position and/or the at least one second climbing element being in a holding position; and/or disposing one, two, or a plurality of part-ring segments, in particular part-ring segments according to one of the preceding aspects; and/or ascending the climbing device by a first climbing movement of the first holding end of the at least one first climbing element in the direction of the second end, and/or by a second climbing movement of the second holding end of the at least one second climbing element in the direction of the second end.

The method according to the invention and the potential refinements thereof have features or method steps, respectively, which render said method particularly suitable for use in a climbing device and the refinements thereof. In terms of further advantages, variants of embodiments, and details of embodiments of these further aspects and the potential refinements thereof reference is also made to the above description pertaining to the corresponding features and refinements of the climbing device.

BRIEF DESCRIPTION OF THE SEVERAL VIEWS OF THE DRAWINGS

Preferred embodiments of the invention will be explained in an exemplary manner by means of the appended figures in which.

DETAILED DESCRIPTION

The same elements or elements with substantially identical or equivalent functions are identified with the same reference signs in the figures.

Figure 1:
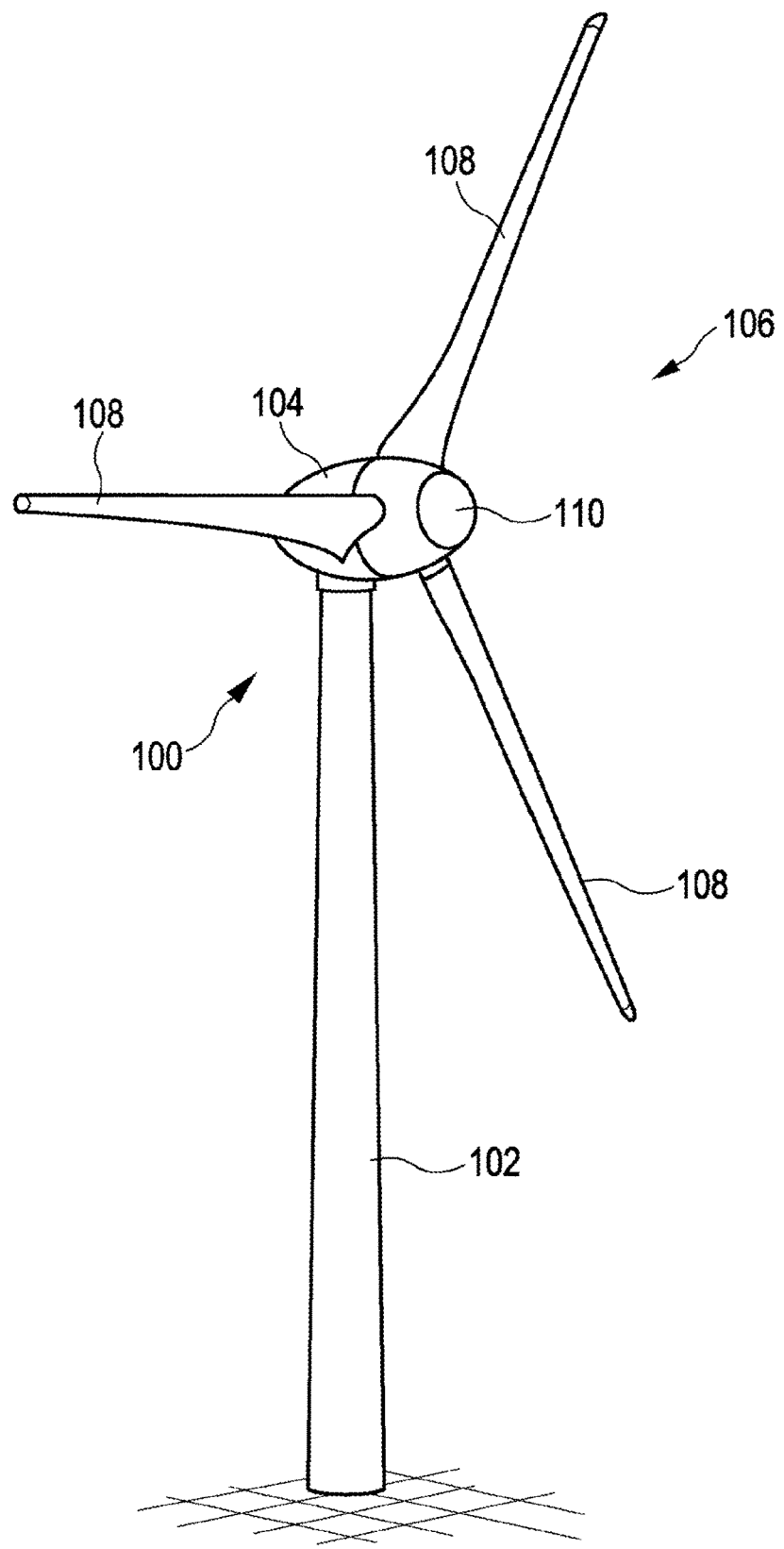
FIG. 1 shows a schematic illustration of an exemplary embodiment of a wind power installation.
Figure 2:
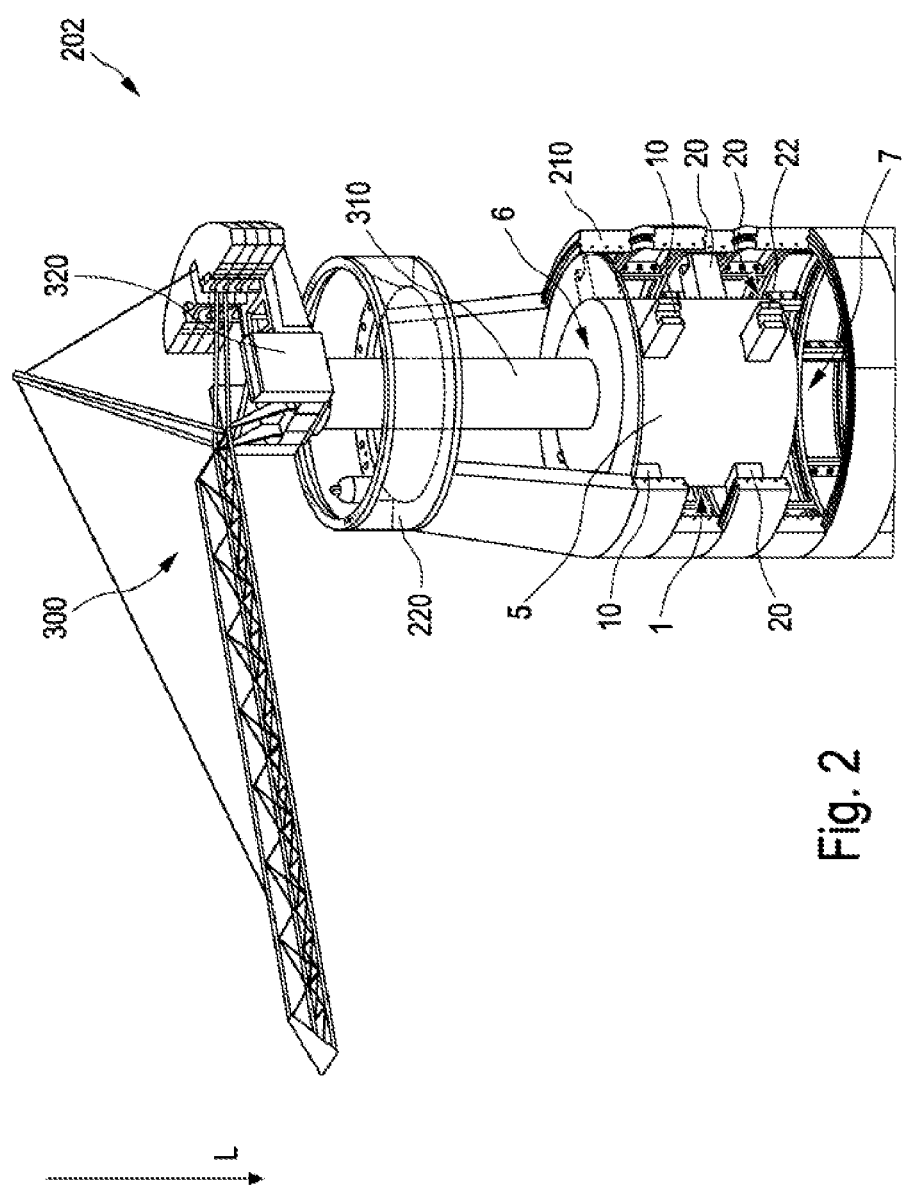
FIG. 2 shows a schematic three-dimensional illustration of an exemplary embodiment of a climbing device.
Figure 3:
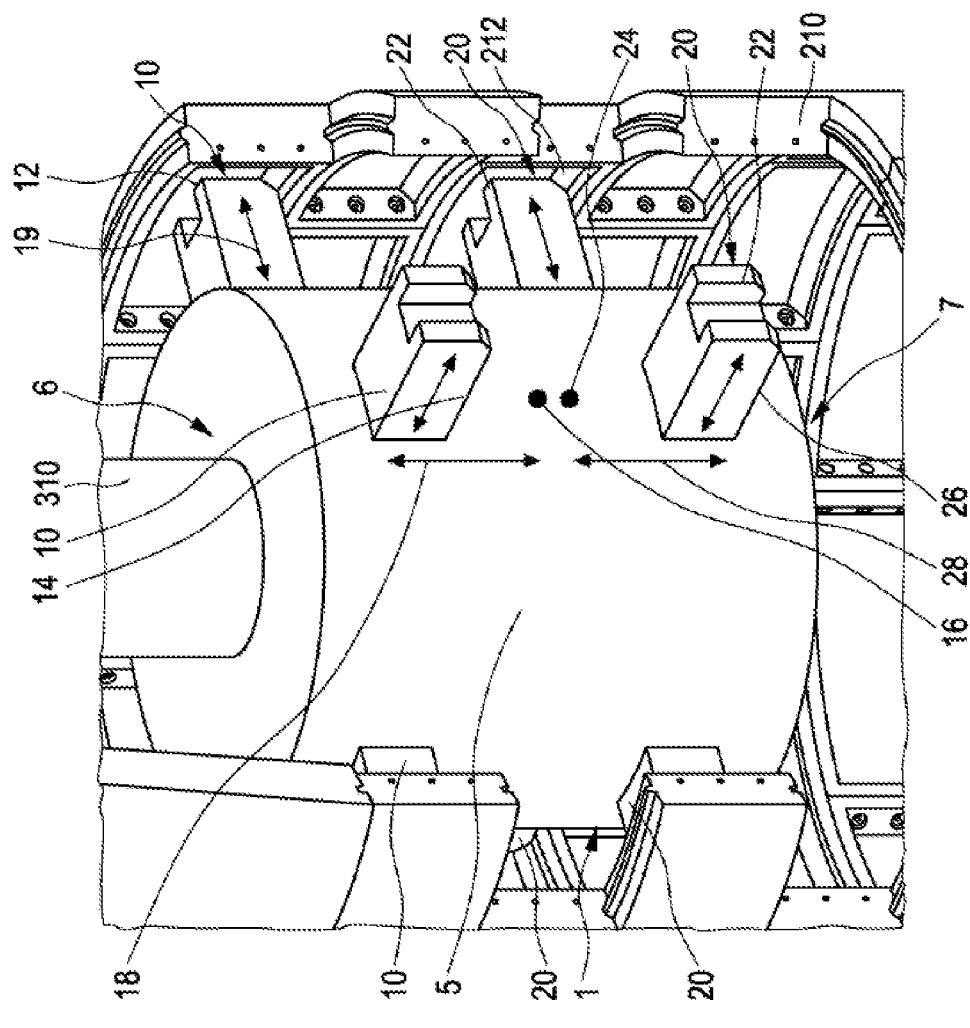
FIG. 3 shows a detailed view of the climbing device according to FIG. 2.

FIG. 1 shows a wind power installation 100 having a tower 102 and a nacelle 104. A rotor 106 having three rotor blades 108 and a spinner 110 is disposed on the nacelle 104. The rotor 106 when in operation is set in a rotating movement by the wind and on account thereof drives a generator in the nacelle 104. The tower 102 is preferably assembled from segments, in particular from part-ring segments. Furthermore preferably, said segments are made from concrete or comprise concrete. The tower 102 has preferably been constructed inter alia by way of a climbing device illustrated in FIGS. 2 to 5.

An exemplary embodiment of a climbing device 1 in the operating state is shown in FIGS. 2 to 5. In the operating state here means in particular that the climbing device 1 is disposed on or within, respectively, a tower 202 so as to move part-ring segments 210 to an assembly position by a lifting device 300. The climbing device 1 comprises a main body 5 which in total has four first climbing elements 10 (only three shown) and in total has four second climbing elements 20. The main body 5 in the longitudinal direction L extends from a first end 6 to a second end 7.

The main body 5 in a manner orthogonal to the longitudinal extent thereof has a cross section which has a circular geometry. The first climbing elements 10 are disposed in a region adjacent to the first end 6. The first climbing elements 10 in the longitudinal direction L are in each case identically spaced apart from the first end 6. The neighboring first climbing elements 10 are in each case disposed so as to be equidistant on the radial external circumferential face of the main body 5. The second climbing elements 20 are disposed in a region adjacent to the second end 7, wherein said second climbing elements 20 in the longitudinal direction L are in each case identically spaced apart from the second end 7. Moreover, the neighboring second climbing elements are in each case disposed so as to be equidistant on the radial circumferential face of the main body 5. There is a spacing of 90° between two first climbing elements and between two second climbing elements. The climbing elements extend from a holding end 12, 22 to an inner end (not illustrated) which is located in the interior of the main body 5.

The second climbing elements 20 presently are located in a holding position and are in each case supported on a step 212 of different part-ring segments 210. The second climbing elements 20 by a second climbing movement 28 can be moved in the longitudinal direction between a second upper reversal point 24 and a second lower reversal point 26. The second climbing elements 20 presently are located in a position of the second lower reversal point 26. The first climbing elements by a first climbing movement 18 move between a first upper reversal point 14 and a first lower reversal point 16.

The first climbing elements 10 presently are already in a holding position in that said climbing elements 10 by a first holding movement 19 were moved from a standby position to the holding position. In a next step, the first climbing elements 10 can now be moved in the longitudinal direction from the present position at the upper reversal point 14 down to a lower reversal point 16, thus moving the main body 5 relative to the tower 202. The exemplary embodiment shows a movement of the climbing elements 10, 20 in which a parallel displacement of the climbing elements 10, 20 is performed. This means that the climbing elements 10, 20 do not carry out any substantially rotating movement. In one further variant of embodiment the climbing elements 10, 20 can also or substantially exclusively carry out a rotating movement, wherein the rotation axis is preferably disposed so as to be orthogonal to the longitudinal direction L. Furthermore preferably, the rotation axis is disposed so as to be parallel with an edge and/or a tangent and/or a secant of the main body. On account of the rotation of a climbing element 10, 20 about a rotation axis which has been explained above and which is spaced apart from the holding end, the holding end can carry out a movement in the direction of the longitudinal direction.

A lifting device 300 which comprises a support element 310 and a jib 320 is disposed on the first end 6 of the climbing device 1. The support element 310 has a cylindrical geometry, the longitudinal direction thereof being aligned so as to be parallel with the longitudinal extent of the climbing device 1. The support element 310 by way of one end is disposed on the first end of the main body 6, and the jib 320 is disposed on a further end opposite said one end. A tower 202 can be constructed by way of the climbing device 1 and by way of the lifting device 300 disposed on the latter. The lifting device 300 can convey in particular part-ring segments 210, but also further tower-configuring elements of further elements, preferably from an earth surface in the direction of the climbing device 1, and dispose said part-ring segments or elements at an envisaged assembly location. The assembly of the part-ring segment 210 or of the further element can be performed at this location by screw-fitting, for example.

Figure 4:
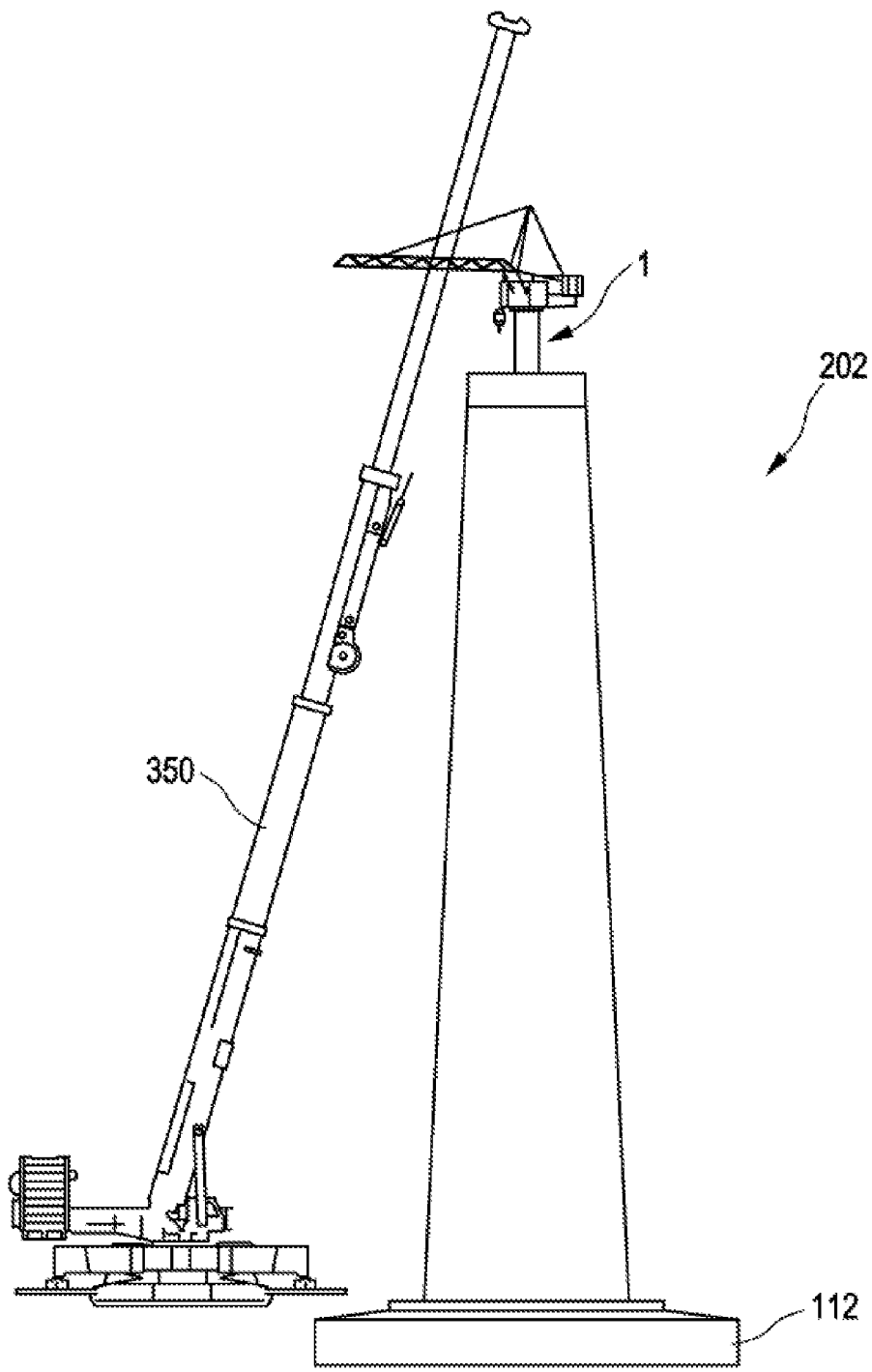
FIG. 4 shows a schematic exemplary disposal of a climbing device in a tower in the assembly state.
Figure 5:
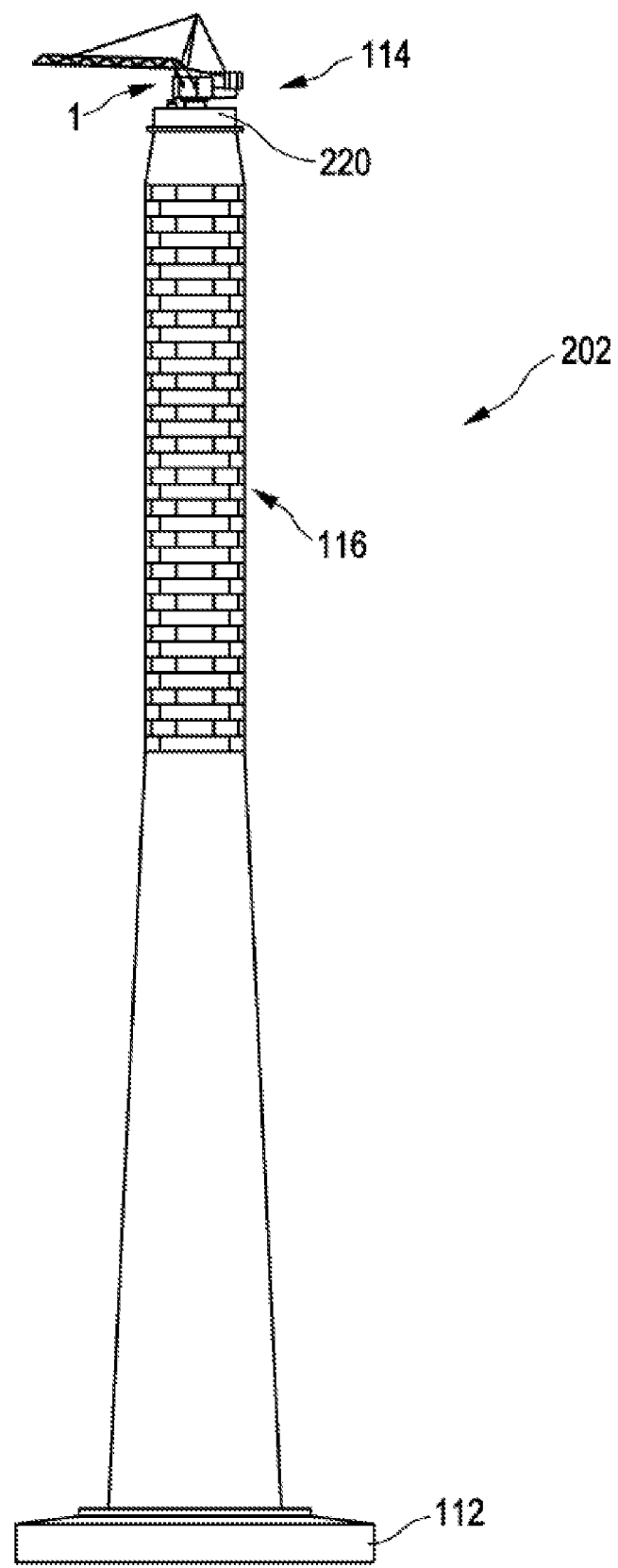
FIG. 5 shows a schematic exemplary disposal of a climbing device in a tower.

The disposal of the climbing device 1 on a partially assembled tower 202 is shown in FIG. 4. The climbing device 1 is disposed in or on the tower, respectively, by means of a mobile crane 350. From there, lifting and disposing part-ring segments 210 which are preferably temporarily stored in the vicinity of the foundation 112 of the tower 202 can be performed on the partially assembled tower 202 by means of the lifting device 300. Once the tower has been substantially completely assembled and the nacelle flange 220 as the element configuring the tower tip has been disposed, the climbing device 1 conjointly with the lifting device 300 can again be lifted out of or from the tower, respectively, preferably by a mobile crane 350.

The segment region 116 of the tower 202 can be produced by the climbing device 1 and the lifting device 300. The segments preferably have such a weight and such dimensions that said weight and dimensions do not require any heavy load transportation. On account thereof, said segments can typically be transported in a cost-effective manner from a production site to an installation site of the tower 102, 202. Moreover, the planning complexity for the heavy load transportation is typically reduced. Moreover, the wind power installation 1 is capable of being assembled without a large crane and there is typically no or a reduced requirement in terms of additional devices on the construction site. Moreover, advantageous effects in terms of the construction of towers 102, 202 of this type result, since a standardization is enabled. Furthermore, advantages are derived in the field of production since smaller factories are required since the individual component parts have comparatively small dimensions and individual weights. Furthermore, there is the potential for automating production which in particular can also be designed in an economical manner, and a further result is that a temporary production that is close to the construction site is comparatively simple to setup. Moreover, the installer when assembling the tower 102, 202 is less dependent on external influences such as, for example, the weather conditions, since the climbing device 1 and a lifting device 300 disposed thereon is functional even in the case of weather conditions which are more inclement than presently is typically the case with large mobile installation cranes.

LIST OF REFERENCE SIGNS

1 Climbing device
5 Main body
6 First end, main body
7 Second end, main body
10 First climbing elements
12 First holding end
14 First upper reversal point
16 First lower reversal point
18 First climbing movement
19 First holding movement
20 Second climbing elements
22 Second holding end
24 Second upper reversal point
26 Second lower reversal point
28 Second climbing movement
100 Wind power installation
102, 202 Tower
104 Nacelle
106 Rotor
108 Rotor blades
110 Spinner
112 Foundation
114 Tower tip
116 Segment region
210 Part-ring segment
212 Step, part-ring segment
220 Nacelle flange
300 Lifting device
310 Support element
320 Jib
350 Mobile crane
L Longitudinal direction

The invention claimed is:

1. A climbing device for carrying out a movement relative to a tower, the climbing device comprising:
a main body having a longitudinal axis that extends from a first end to a second end, wherein the second end, in an operating state, faces a foundation of the tower;
at least one first climbing element having an axis that extends between a first inner end and a first holding end;
at least one second climbing element having an axis that extends between a second inner end and a second holding end,
wherein the at least one first climbing element is disposed and configured to:
carry out a first holding movement of the first holding end relative to the main body, by way of a first holding movement direction that is orthogonal to the longitudinal axis; and
carry out a first climbing movement for moving the climbing device relative to the tower, of the first holding end relative to the main body, by way of a climbing movement direction that is parallel with the longitudinal axis;
wherein the at least one second climbing element is disposed and configured to:
carry out a second holding movement of the second holding end relative to the main body, by way of a second holding movement direction that is orthogonal to the longitudinal axis; and carry out a second climbing movement for moving the climbing device relative to the tower, of the second holding end relative to the main body, by way of the climbing movement direction that is parallel with the longitudinal axis; and a safety mechanism, wherein the first holding movement of the at least one first climbing element is possible only when a region adjacent to the second holding end of the at least one second climbing element is connected to a wall of the tower.

2. The climbing device as claimed in claim 1, wherein the climbing device comprises:
a plurality of first climbing elements; and
a plurality of second climbing elements.

3. The climbing device as claimed in claim 1, wherein the at least one first climbing element has a first drive region adjacent to the first inner end, wherein the first inner end is disposed in an interior of the main body, wherein the at least one second climbing element has a second drive region adjacent to the second inner end, wherein the second inner end is disposed in the interior of the main body.

4. The climbing device as claimed in claim 1, wherein the climbing device has at least one drive configured to move the at least one first climbing element and the at least one second climbing element in the first and second holding movement directions, respectively, and in the climbing movement direction.

5. The climbing device as claimed in claim 1, wherein the first holding end of the at least one first climbing element and the second holding end of the at least one second climbing element is disposed and configured to form at least one of a force-fitting or form-fitting connection with an inner wall of the tower.

6. The climbing device as claimed in claim 2, wherein at least one of:
the plurality of first climbing elements, in a circumferential direction, have in each case a same spacing between adjacent first climbing elements of the plurality of first climbing elements; or
the plurality of second climbing elements, in a circumferential direction, have in each case a same spacing between adjacent second climbing elements of the plurality of second climbing elements.

7. The climbing device as claimed in claim 1, wherein the at least one first climbing element is configured to simultaneously carry out the first climbing movement and the first holding movement, and wherein the at least one second climbing element is configured to simultaneously carry out the second climbing movement and the second holding movement.

8. The climbing device as claimed in claim 4, wherein the at least one drive is configured for carrying out in each case in a mutually independent manner the first climbing movement, the second climbing movement, the first holding movement, and the second holding movement of the at least one first climbing element and the at least one second climbing element, respectively.

9. The climbing device as claimed in claim 1, comprising a control device configured to control movement of the climbing device relative to the tower in that at least one of: the first climbing movement, the second climbing movement, the first holding movement, or the second holding movement of the at least one first climbing element or the at least one second climbing element, are determined in relation to at least one of: movement path, movement speed, or movement accelerations.

10. The climbing device as claimed in claim 1, wherein the climbing device comprises a lifting device, wherein the lifting device is disposed on the first end of the main body.

11. A part-ring segment for a tower, the part-ring segment being configured as an envelope segment, and having a step, wherein the climbing device as claimed in claim 1 is supported by the step.

12. A tower having annular tower portions formed from a plurality of part-ring segments of the part-ring segment as claimed in claim 11, wherein each of the plurality of part-ring segments mutually abut on at least one substantially vertical abutment and on at least one substantially horizontal abutment.

13. A wind power installation comprising the tower as claimed in claim 12, wherein the tower has a cross section that is orthogonal to a longitudinal axis of the wind power installation, wherein the cross section is configured so as to be substantially round, triangular, or polygonal.

14. A method for producing a tower, the method comprising:
supporting the climbing device as claimed in claim 1 on at least one step of a first part-ring segment such that the at least one first climbing element is in a holding position; and
ascending the climbing device by the second climbing movement of the second holding end of the at least one second climbing element in a direction of the second end.

15. The method as claimed in claim 14, further comprising:
supporting the climbing device on at least one step of a second part-ring segment; and
ascending the climbing device by the first climbing movement of the first holding end of the at least one first climbing element in the direction of the second end.

16. The climbing device as claimed in claim 4, wherein the at least one drive is a hydraulic drive or an electric drive.

17. The climbing device as claimed in claim 1, wherein the tower is a tower of a wind power installation.

18. The climbing device as claimed in claim 1, wherein a holding movement of the at least one second climbing element is possible only when a region adjacent to the first holding end of the at least one first climbing element is connected to the wall of the tower.

19. The climbing device as claimed in claim 11, wherein the envelope segment is a concrete member, wherein the step has at least one face that in the operating state is substantially horizontal.

* * * * *